Figure 1:
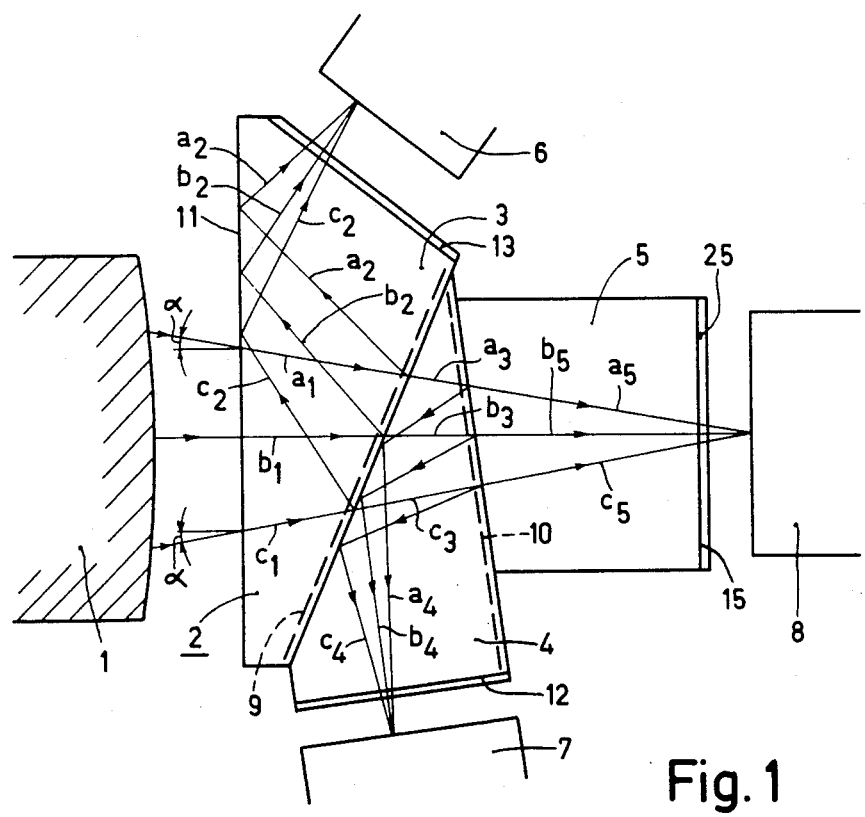

United States Patent [19]

Verdijk et al.

[11] 4,009,941
[45] Mar. 1, 1977

[54] COLOR-SEPARATING PRISM ARRANGEMENT OF WHICH SOME SURFACES ADJOIN DICHROIC LAYERS

[75] Inventors: Leonardus Petrus Gerardus Verdijk; Engbert Tienkamp, both of Eindhoven, Netherlands

[73] Assignee: U.S. Philips Corporation, New York, N.Y.

[22] Filed: Jan. 6, 1975

[21] Appl. No.: 538,719

[30] Foreign Application Priority Data

Jan. 7, 1974   Netherlands .................. 7400148

[52] U.S. Cl. .................. 350/173; 358/55
[51] Int. Cl.² ........................ G02B 27/10
[58] Field of Search ........ 350/173, 166; 358/50, 358/55

[56] References Cited
UNITED STATES PATENTS

| | | | |
|---|---|---|---|
| 3,202,039 | 8/1965 | DeLange et al. | 350/173 |
| 3,602,637 | 8/1971 | Katsuta et al. | 350/173 X |
| 3,606,521 | 9/1971 | Athey | 350/171 X |
| 3,653,748 | 4/1972 | Athey | 350/171 |
| 3,659,918 | 5/1972 | Tan | 350/166 |
| 3,718,752 | 2/1973 | Katsuta et al. | 350/173 X |
| 3,802,763 | 4/1974 | Cook et al. | 350/173 |
| 3,932,027 | 1/1976 | Cook et al. | 350/173 |

*Primary Examiner*—David H. Rubin
*Attorney, Agent, or Firm*—Frank R. Trifari; Carl P. Steinhauser

[57] ABSTRACT

A colour-separating prism arrangement having surfaces which adjoin dichroic layers of mutually different colors with either the lower limit of the second dichroic layer which reflects the red light being substantially equal to the upper limit of the first dichroic layer, or the upper limit of the second dichroic layer which reflects the blue light being substantially equal to the lower limit of the first dichroic layer.

4 Claims, 4 Drawing Figures

COLOR-SEPARATING PRISM ARRANGEMENT OF WHICH SOME SURFACES ADJOIN DICHROIC LAYERS

The invention relates to a colour-separating prism arrangement of which some surfaces adjoin dichroic layers of mutually different colours. It also relates to a television camera with a prism arrangement which is disposed behind the objective, in which camera the separated light beams which emerge from the prism arrangement are passed to camera tubes.

In a known prism arrangement, as described in U.S. Pat. No. 3,202,039, the angles which the dichroic layers make with the non-reflected optical axis of the arrangement are smaller than 30°. Undesired polarisation effects in the case of oblique incidence of the light on the dichroic layers then occur to a slight extent only. In this respect it is irrelevant which component of the light which impinges on the arrangement is reflected at the first dichroic layer.

As the first dichroic layer a layer may be selected which reflects the green component of the light. This is particularly advantageous when the aperture of the objective is large and/or the distance from the exit pupil of the objective to the image plane is small. The rays which pass from the edges of the exit pupil to a point in the image plane via the dichroic layer then enclose a comparatively large angle. Consequently the dichroic layer is hit under substantially varying angles. It is known, see for example, "Philips Technisch Tijdschrift", 1962, page 264, that the effective optical thickness of a layer having a thickness $d$ equals $nd \cos \phi$, n being the refractive index of the layer and $\phi$ the angle which the light ray which traverses the layer encloses with the normal to the layer. At an increasing angle $\phi$ the reflection and transmission curves of the layer are shifted towards smaller wavelengths. In the case of a dichroic layer with a bandpass characteristic, i.e. a layer which reflects the green component of the light, both the upper and the lower limit of the reflection and the transmission curves are shifted towards smaller wavelengths. Hence, when as the first dichroic layer a layer is selected which reflects the green component of the light, both the lower limit and the upper limit of that component are shifted towards smaller wavelengths when the angle of incidence on said layer increases. The band-width of the green component then remains substantially constant. Consequently, the integral of the amount of green light which is reflected and incident on the associated camera tube also remains virtually constant. A requirement to be met is that the spectral characteristic of said camera tube has a sufficiently flat response in the green region.

The light transmitted by the first dichroic layer, which comprises the blue and red components, is separated into a red and a blue component at a second dichroic layer. When a red-reflecting layer is selected as second dichroic layer, the lower limit of the second dichroic layer, according to the invention, is selected to be equal or substantially equal to the upper limit of the first dichroic layer. If a blue reflecting layer is chosen as second dichroic layer, the upper limit of the second dichroic layer, according to the invention is selected to be equal or substantially equal to the lower limit of the first dichroic layer.

The invention utilizes the fact that the first and the second dichroic layer make opposed angles with the non-refracted optical axis of the arrangement. Rays which are incident on the first layer at a large angle, are incident on the second layer at a smaller angle and vice versa. This results in the shift of the reflection and transmission curves of the first layer being compensated by the opposite shift of the reflection and transmission curves of the second layer.

Frequently, it is favourable when the first layer, which reflects the green light, is such that the reflection is not total, so that a part of the green light is passed to the second layer. Said step is taken to compensate for the difference in sensitivity of the camera tubes for the different components of the light. Then, to pass the portion of the green light which is transmitted by the first dichroic layer to the camera tubes which intercept the red and the blue light respectively, the second dichroic layer must be such that a secondary reflection peak in the transmission band in the green region is obtained.

The invention will be described with reference to the drawing which in

FIG. 1 shows an embodiment of a prism arrangement according to the invention, and in FIG. 2 some graphs in illustration of the operation of the arrangement of FIG. 1.

In the embodiment of FIG. 1 a light beam emerges from the objective 1 of a television camera, which beam falls onto the prism arrangement 2. The prism arrangement 2 consists of three sections 3, 4 and 5. The sections 3 and 4 are isolated from each other by a dichroic layer 9, shown by a dashed line, and an adjoining layer of air (not shown for simplicity). The sections 4 and 5 are isolated by a dichroic layer 10.

The light beam which is incident on the prism arrangement 2 is refracted at the entrance face 11 of the prism section 3 and is subsequently separated at the dichroic layer 9 into a green component which is reflected and a red and a blue component which are transmitted. Upon reflection at the entrance face 11 the green component emerges via the exit face 13 and impinges on the photocathode of the camera tube 6. The components which are transmitted by the layer 9 traverse the prism section 4 and at the dichroic layer 10 they are separated into a red component which is reflected and a blue component which is transmitted. The red component which is reflected at the layer 10, upon reflection at the glass-air interface (not shown) between the prism sections 3 and 4, emerges via the exit face 12 of the prism section 4 of the arrangement 2 and falls onto the photocathode of the camera tube 7. The blue component which is transmitted by the layer 10 traverses the prism section 5 and via the exit face 15 of the prism section 5 emerges from the arrangement 2 and falls onto the photo-cathode of the camera tube 8.

FIG. 1 shows the path of three rays which from a point of the scene fall onto the prism arrangement 2, viz. the ray $b_1$ which is incident on the arrangement parallel to the unrefracted optical axis of the arrangement and the two rays $a_1$ and $c_1$ which via the edges of the exit pupil of the objective 1 impinge on the arrangement. The rays $a_1$ and $c_1$ make equal but opposed angles with the optical axis of the arrangement. The ray $c_1$ is incident at a comparatively large angle with the normal to the dichroic layer 9, which layer makes an angle of e.g. approximately 30° with the normal to the unrefracted optical axis. The rays $a_1$ is incident at a relatively small angle with the normal to the dichroic layer 9. Conversely, the component $a_3$ of the ray $a_1$ which is transmitted by the dichroic layer 9 is incident at a comparatively large angle with the normal to the dichroic layer 10 and the component $c_3$ of the ray $c_1$ which is transmitted by the dichroic layer 9 is incident at comparatively small angle with the normal to the dichroic layer 10.

According to the invention the layers 9 and 10 are designed so that the lower limit of the layer 10 is equal or substantially equal to the upper limit of the layer 9. (The upper and the lower limit of a dichroic layer is to be understood to mean the wavelength at which 50% of the light of said wavelength which is incident on the layer is reflected and 50% is transmitted respectively. In between the upper and the lower limit substantially 100% of the light in the relevant wavelength range is reflected).

Figure 2A:
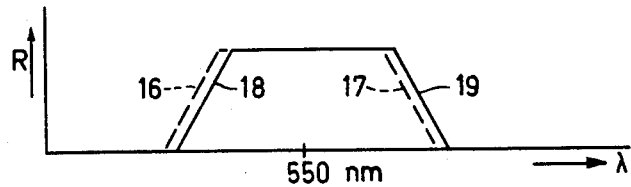
Figure 2B:
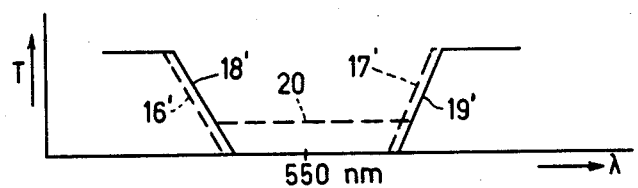
Figure 2C:
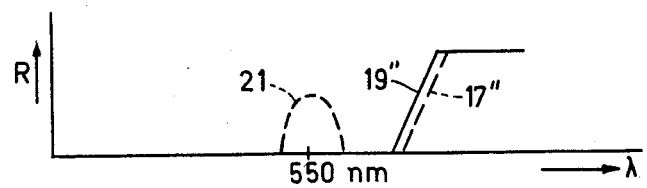

FIGS. 2a, 2b and 2c show graphs of the transmission and reflection characteristics of the dichroic layers 9 and 10 for the purpose of illustration, viz. the reflection characteristic R of the layer 9 in FIG. 2a, the transmission characteristic T of said layer in FIG. 2b, and the reflection characteristic R of the layer 10 in FIG. 2c.

At increasing angle of incidence of a ray on a dichroic layer the flanks of the reflection and transmission characteristics associated with said layer are shifted towards shorter wavelengths. In FIG. 2a the shifts of the reflection characteristic R of the layer 9 are represented by the dashed lines 16, 17 and 18, 19 caused by the rays $c_1$ and $a_1$ respectively in the arrangement of FIG. 1. In FIG. 2b, which is opposite to FIG. 2a (for it is assumed that there are no losses in the layer 9) the dashed lines 16', 17' and 18', 19' respectively represent the shifted flanks of the transmission curve T of the layer 9. In FIG. 2c, which shows the reflection curve R of the layer 10, the flank shifts which are caused by the rays $c_3$ and $a_3$ are represented by the dashed lines 17" and 19". The line 17", if it were drawn in FIG. 2b, would substantially coincide with the line 19' and the line 19", if it were drawn in FIG. 2b, would substantially coincide with the line 17'. In other words: the wavelength shifts caused by the layers 9 and 10 compensate each other.

It is evident that a similar compensation is achieved when the layer 10 would be a dichroic layer that reflects the blue light and the flank of the reflection curve R of said blue layer would substantially coincide with the flank 18' of the blue portion of the transmission curve T of the layer 9.

In order to obtain equal sensitivities for the three camera tubes 6, 7 and 8, a part of the green light is supplied to the camera tubes 7 and 8. The dichroic layer 9 must then be such that a part of the light which is incident on the layer in the wavelength region around 550 nm is transmitted. In the graph of FIG. 2b the line 20 represents the amount of light in the green region which is transmitted. According to the invention the dichroic layer 10 must then be such that the reflection characteristic exhibits a secondary peak in the range around 550 nm, i.e. a "hump" in said wavelength region, denoted by 21 in the graph of FIG. 2c.

The transmission curve of the filter 25 between the prism section 5 and the camera tube 8 extends into the green region. For reasons of colorimetry it is advantageous to shift a flank of said curve in the blue range towards a smaller wavelength, i.e. in FIG. 2b a flank which is disposed to the left of the line 16'. Moreover, this will prevent problems owing to the shift which is caused by the short-wave flank of the dichroic layer 9 in the blue light transmitted by said layer.

What is claimed is:

1. An optical system for tri-color separation for use in a color television camera comprising a plurality of prisms arranged in succession along a non-reflecting optical axis for separating the light directed toward said prism arrangement into a plurality of components, a first prism having a green-reflective dichroic layer along one boundary surface forming a given angle with the non-reflecting optical axis, said green reflective dichroic layer having upper and lower limits of reflectivity at which 50% of the light at wave-lengths corresponding to said limits is reflected and 50% is transmitted to a second boundary surface opposing said first boundary surface and adapted by virtue of an air-glass transition to totally reflect the green light component of the impinging light reflected back by said green reflective dichroic layer, a second prism having a first boundary surface adjacent said first boundary surface of the first prism and having a second boundary surface provided with a second dichroic layer forming an angle with the non-reflecting optical axis opposed to the angle formed by the first dichroic layer for separating the red light component from the blue light component in the light transmitted through said first dichroic layer, said first boundary surface of said second prism adjacent to said first boundary surface of the first prism being adapted by virtue of the air-glass transition to totally reflect the light component reflected back by the second dichroic layer, said second dichroic layer having upper and lower limits of reflection at which 50% of the light at wavelengths corresponding to said limits is reflected and 50% is transmitted, one of said upper and lower limits of reflection of the second dichroic layer substantially equaling the other corresponding limit of reflection of the first layer, said second dichroic layer having a transmission band with a secondary reflection peak for green light whereby a portion of the green light component transmitted by the first dichroic reflector is respectively transmitted and reflected by the second dichroic layer to compensate for increased sensitivity of the camera tubes to green light.

2. An optical system as claimed in claim 1 in which the second dichroic layer reflects red light and has a lower limit of reflection substantially equal to the upper limit of reflection of the first dichroic layer.

3. An optical system as claimed in claim 1 wherein the second dichroic layer reflects blue light and has an upper limit of reflection substantially equal to the lower limit of reflection of the first dichroic layer.

4. An optical system as claimed in claim 1 wherein the second dichroic layer includes a filter with a cut-off wave-length which is below the smallest wave-length of the light incident on the filter, the filter being relatively transmissive to the green light component.

* * * * *